United States Patent
Terwal

(10) Patent No.: US 11,695,537 B2
(45) Date of Patent: Jul. 4, 2023

(54) DIGITAL SIGNAL PROCESSOR/NETWORK SYNCHRONIZATION

(71) Applicant: Bose Corporation, Framingham, MA (US)

(72) Inventor: Remco Terwal, West Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 21 days.

(21) Appl. No.: 17/335,662

(22) Filed: Jun. 1, 2021

(65) Prior Publication Data

US 2022/0385443 A1  Dec. 1, 2022

(51) Int. Cl.
*H04L 7/00* (2006.01)
*H04L 49/90* (2022.01)

(52) U.S. Cl.
CPC .......... *H04L 7/0012* (2013.01); *H04L 7/0016* (2013.01); *H04L 49/9094* (2013.01)

(58) Field of Classification Search
CPC .. H04L 7/0012; H04L 7/0016; H04L 49/9094
See application file for complete search history.

(56) References Cited

U.S. PATENT DOCUMENTS

| 6,029,221 | A  | * | 2/2000  | Wu       | G06F 3/16    |
|           |    |   |         |          | 379/88.07    |
| 7,599,456 | B1 | * | 10/2009 | Chi      | H04L 25/05   |
|           |    |   |         |          | 370/232      |
| 10,009,862| B1 | * | 6/2018  | Malovany | H04W 56/001  |

* cited by examiner

*Primary Examiner* — Chandrahas B Patel
(74) *Attorney, Agent, or Firm* — Bose Corporation

(57) ABSTRACT

A system for synchronizing a local audio processing clock rate of a digital signal processor (DSP) to an audio clock rate of a network to which the DSP is connected. The system includes an adjustable clock synthesizer that is configured to establish the local audio processing clock rate of the DSP. The DSP is configured to generate events that are associated with the local audio processing clock rate of the DSP. The DSP is further configured to monitor the generated events over time and based on the monitored events cause the adjustable clock synthesizer to adjust the local audio processing clock rate of the DSP to better match the network audio clock rate.

14 Claims, 4 Drawing Sheets

DIGITAL SIGNAL PROCESSOR/NETWORK SYNCHRONIZATION

BACKGROUND

This disclosure relates to synchronizing a digital signal processor and a network to which it is connected.

In order to maintain high-quality low-latency audio in an audio system where a digital audio amplifier acts as a clock slave node connected to a clock master node, the amplifier's clock rate needs to remain synchronized to the synchronous network clock rate. Asynchronous sample rate converters (ASRCs) and phase lock loops (PLLs) are commonly used to synchronize a processor to a network. These solutions can be expensive and can introduce unacceptable latency.

SUMMARY

Aspects and examples are directed to a system that synchronizes the local audio processing clock frame rate of a digital signal processor (DSP) to the audio clock frame rate of a network. The system can involve using the DSP to generate events that are associated with the local clock rate and then adjusting the local clock rate based on the monitored events. In some examples the monitored events are associated with the movement of audio data through the DSP memory that is indicative of both the network clock rate and the local clock rate.

All examples and features mentioned below can be combined in any technically possible way.

In one aspect a system for synchronizing a local audio processing clock rate of a digital signal processor (DSP) to an audio clock rate of a network to which the DSP is connected includes an adjustable clock synthesizer that is configured to establish the local audio processing clock rate of the DSP. The DSP is configured to generate events that are associated with the local audio processing clock rate of the DSP. The DSP is further configured to monitor the generated events over time and based on the monitored events cause the adjustable clock synthesizer to adjust the local audio processing clock rate of the DSP to better match the network audio clock rate.

Some examples include one of the above and/or below features, or any combination thereof. In an example the local audio processing clock is a frame clock and the audio clock of the network is a frame clock. In some examples the generated events are associated with a memory of the DSP. In an example the generated events comprise interrupts that are generated when audio data frames are inputted or outputted from the DSP memory. In an example the DSP is configured to monitor generated events by counting the interrupts. In an example the memory comprises an input buffer that is configured to store audio frames received over the network and an output buffer that is configured to store audio frames that have been read from the input buffer and processed by the DSP. In an example the input and output buffers are each configured to simultaneously read and write audio data. In an example the generated events are based on audio frames read from the output buffer. In an example the DSP monitoring of events comprises a comparison of events that are based on audio frames read from the output buffer and a readout of an input buffer write pointer position. In an example the DSP is further configured to apply a moving average filter to the readout of the input buffer write pointer position.

Some examples include one of the above and/or below features, or any combination thereof. In an example the DSP is configured to cause the adjustable clock synthesizer to adjust the local audio processing clock rate of the DSP based on a difference over time between a read pointer of the output buffer and the input buffer write pointer. In an example the DSP causes the adjustable clock synthesizer to speed up the local audio processing clock rate if the input buffer write pointer has advanced as compared to the output buffer read pointer. In an example the DSP causes the adjustable clock synthesizer to slow down the local audio processing clock rate if the input buffer write pointer has receded as compared to the output buffer read pointer. In an example the DSP is further configured to assess whether either buffer is in an overflow or underflow condition based on the difference over time between the output buffer read pointer and the input buffer write pointer. In an example the buffers each have a depth and an underflow or overflow is based on the difference over time between the output buffer read pointer and the input buffer write pointer being at least equal to the buffer depth.

In another aspect a system for synchronizing a local audio processing clock rate of a DSP to an audio clock rate of a network to which the DSP is connected includes an adjustable clock synthesizer that is configured to establish the local audio processing clock rate of the DSP. The DSP is configured to count cycles of both the local audio processing clock of the DSP and the audio clock of the network to which the DSP is connected. Based on the counted cycles the DSP either directly or indirectly through an intermediate processor causes the adjustable clock synthesizer to adjust the local audio processing clock rate of the DSP to better match the network audio clock rate.

Some examples include one of the above and/or below features, or any combination thereof. In an example the local audio processing clock is a frame clock and the audio network clock is a frame clock. In an example the DSP is configured to generate an interrupt when audio data frames are inputted or outputted from a first DSP memory. In an example the DSP is configured to count cycles of both the local audio processing clock of the DSP and the audio clock of the network to which the DSP is connected based on the generated interrupts and the state of a second DSP memory during each interrupt. In an example the DSP is configured to cause the adjustable clock synthesizer to adjust the local audio processing clock rate of the DSP based on a difference between an output read pointer of a DSP output buffer and an input write pointer of a DSP input buffer.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1:
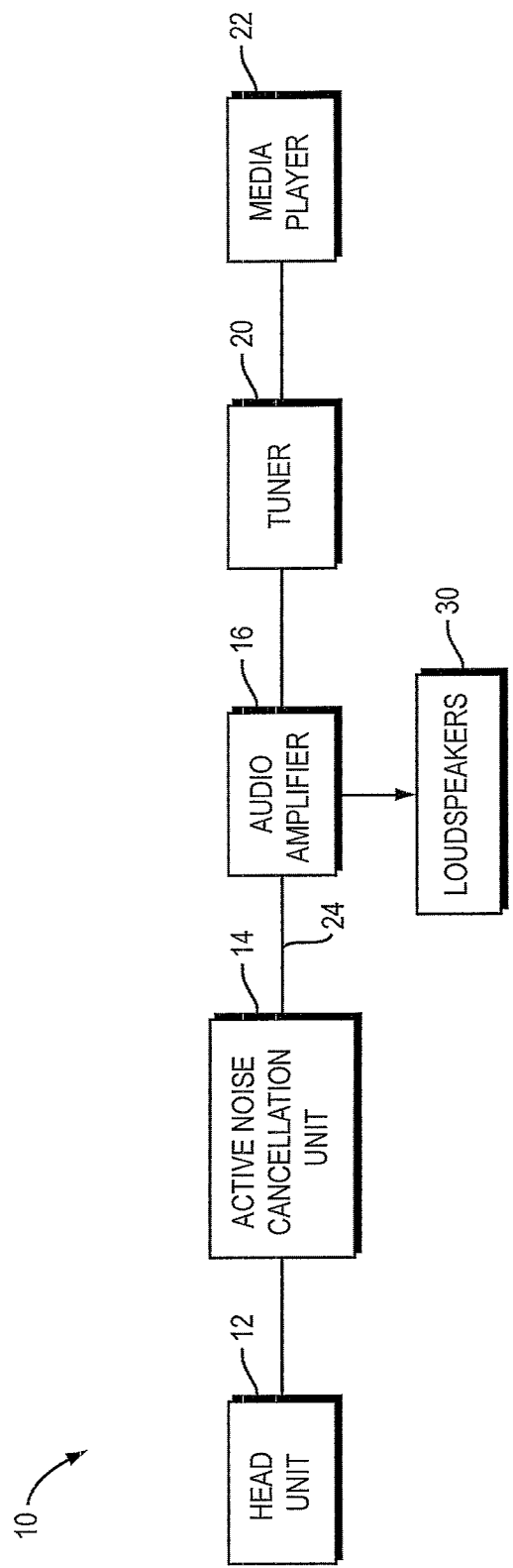
FIG. 1 is a schematic block diagram of an automotive audio system.

In some examples the present digital signal processor (DSP)/network synchronization is accomplished in a system for synchronizing the local audio processing clock frame rate of the DSP to the audio clock frame rate of the network to which the DSP is connected. The system includes an adjustable clock synthesizer that is configured to establish the local audio processing clock rate of the DSP. The DSP is configured to generate events that are associated with the local audio processing clock rate of the DSP. The DSP is further configured to monitor the generated events over time. Based on the monitored events the DSP (itself, or through an intermediate controller) causes the adjustable clock synthesizer to adjust the local audio processing clock frame rate of the DSP to better match the network audio clock frame rate.

In some examples the generated events are associated with a memory of the DSP. In an example the generated events comprise interrupts that are generated when audio data frames are inputted or outputted from the DSP memory. In an example the DSP is configured to monitor generated events by counting the interrupts. In an example the memory comprises an input buffer (e.g., a ring buffer) that is configured to store audio frames received over the network and an output buffer (e.g., a ring buffer) that is configured to store audio frames that have been read from the input buffer and processed by the DSP. In an example the input and output buffers are each configured to simultaneously read and write audio data. In a specific example the generated events are based on audio frames read from the output buffer. In a more specific example the DSP monitoring of events comprises a comparison of events that are based on audio frames read from the output buffer and a readout of an input buffer write pointer position. In an example the DSP is further configured to apply a moving average filter to the readout of the input buffer write pointer position.

In some examples the DSP is configured to cause the adjustable clock synthesizer to adjust the local audio processing clock rate of the DSP based on the difference over time between the read pointer of the output buffer and the input buffer write pointer. In an example the DSP causes the adjustable clock synthesizer to speed up the local audio processing clock rate if the input buffer write pointer has advanced as compared to the output buffer read pointer, and causes the adjustable clock synthesizer to slow down the local audio processing clock rate if the input buffer write pointer has receded as compared to the output buffer read pointer.

In an example the DSP is further configured to assess whether either buffer is in an overflow or underflow condition based on the difference over time between the output buffer read pointer and the input buffer write pointer. In an example the underflow or overflow is based on the difference over time between the output buffer read pointer and the input buffer write pointer being at least equal to the buffer depth.

Also featured herein is a system for synchronizing the local audio processing clock frame rate of a DSP to the audio clock frame rate of a network to which the DSP is connected. In the system the DSP is configured to count cycles of both the local audio processing clock and the network audio clock. Based on the counted cycles the adjustable clock synthesizer is caused to adjust the local audio processing clock rate of the DSP to better match the network audio clock rate.

In an example of this system the DSP is configured to generate an interrupt when audio data frames are inputted or outputted from the DSP memory. In an example the DSP is configured to count cycles of both the local audio processing clock and the network audio clock based on the generated interrupts and the state of the DSP memory during each interrupt. In an example the DSP is configured to cause the adjustable clock synthesizer to adjust the local audio processing clock rate of the DSP based on a difference between an output read pointer of the DSP output buffer and an input write pointer of the DSP input buffer.

Digital audio amplifiers in motor vehicle sound systems can use an automotive audio bus (A2B) network for audio data reception and transmission from and to upstream and downstream sources. In many media systems the amplifier will be an A2B slave node connected to an A2B clock master node elsewhere in the system. For example, automotive audio system 10, FIG. 1, includes digital audio amplifier 16 on A2B network 24. Loudspeaker(s) 30 are driven by amplifier 16. Typically, audio system 10 includes an audio head unit 12 that is a source of audio signals processed by amplifier 16. Audio system 10 can also include one or more of active noise cancelation unit 14, tuner 20, and media player 22, each of which is well known in the field and so not further described herein. Additional or alternative components can be included in system 10, as is known in the field.

These A2B amplifiers typically use a digital signal processor (DSP) to process input audio data. For artifact-free audio output the clock rate of the DSP needs to be synchronized to the A2B network sample rate. One way to synchronize the DSP is to feed the recovered master clock of the A2B transceiver to the DSP and use it as the framework clock source. However, when the network is lost, the DSP framework will stall. The A2B transceiver implements a clock sustain function, but it is typically 1024 cycles long and its frequency winds down very quickly in the sustain time. Besides, the A2B clock jitter becomes of the order of 10 ns rms when the amplifier is the last node, which can lead to poor high frequency audio quality. A secondary effect is that the digital amplifier back-end will stall as well because its clock source is directly coupled to DSP clock. These issues will typically lead to unacceptable audio artifacts and so should be avoided.

A potential solution is to provide a local low jitter (e.g., 100 ps rms) clock to the DSP to prevent the DSP and amplifier back-end from stalling when the network is lost or unreliable. This leads to a new issue to deal with: the local clock of the DSP will not be exactly at the same frequency compared to the network frequency. Over time this results in receive buffer overflow or underflow which also causes audio artifacts due to the necessary framework reset in the DSP.

One way to solve this is to use an Asynchronous Sample Rate Converter (ASRC) between the network clock domain and the local clock domain. The ASRC matches the frame rates of the network and local systems. To do so, the ASRC contains FIR filters which can introduce considerable latency, in many cases 3 ms or more. This extra network latency is unacceptable in systems relying on low latency audio.

In the present disclosure, the local clock is adjusted to match the network clock without the use of ASRC filters. This approach results in low jitter and latency. This technique can be implemented using a low jitter frequency synthesizer digital phase lock loop (PLL) hardware component that can compare the A2B network recovered frame rate to the local frame rate derived from a low jitter crystal reference clock. The PLL's output frequency, which is used instead of just a simple crystal or clock static oscillator, can be adjusted to match the recovered A2B frame rate under control of a lightweight and low overhead software control loop that is described herein.

Figure 2:
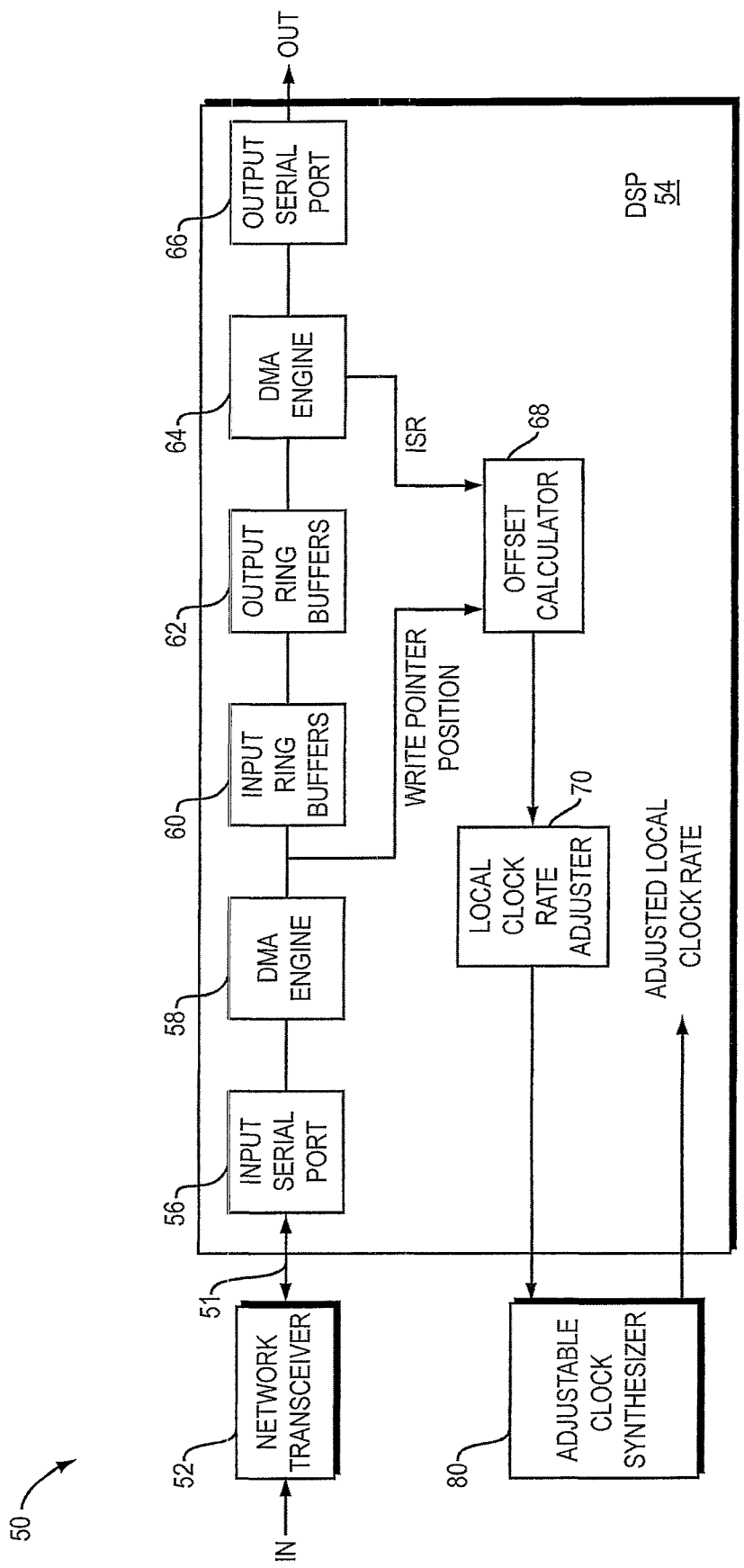
FIG. 2 is a schematic block diagram of a system for synchronizing a local audio processing clock rate of a DSP to an audio clock rate of a network to which the DSP is connected.

System 50, FIG. 2, is an exemplary implementation of a system for synchronizing a local audio processing clock rate of DSP 54 to an audio clock rate of a network 51 to which the DSP is connected. Networked audio is received via the A2B network transceiver 52. The network time division multiplexing (TDM) and recovered bit and frame clocks connect directly into a dedicated input serial port 56 of DSP 54. The clocks belong to the accompanied data and as a result will never slip relative to each other and guarantees that audio serial port 56 will receive this data without errors.

Audio serial port 56 in the DSP slaves to an audio serial port (not shown) in network transceiver 52. Dynamic memory allocation (DMA) engine 58 in the DSP takes fully received samples and places these samples in the receive (input) ring buffers 60 in memory of the DSP. The DMA uses a ping-pong mechanism to switch the buffers between the network clock domain and the local clock domain of the DSP. The network clock domain is formed by transceiver 52 and connected audio serial port 56. The rest of the DSP is in the local clock domain. The assumption in this ping-pong mechanism 60 is that samples are delivered into the buffers exactly as fast as they are taken out. This will prevent a buffer from getting over filled before the switch (e.g. buffer overflow) or being emptied too fast (e.g. buffer underflow). Clock synchronization between the network clock and local clock is required. Since data is delivered and processed as frames, the network frame clock and local frame clock are of concern.

To accomplish clock synchronization using adjustable clock synthesizer 80, system 50 requires a process to measure the frequency of the network frame clock versus the local frame clock generated by clock synthesizer 80. Because it is complicated to measure frequency in embedded systems, it is better to observe or monitor events that are generated by each of these frame clocks over a period.

One way to compare events is to place an up-counter on each of the network and local frame clocks and compare their values after a certain period. If one counter is ahead of the other, the local clock can be adjusted such that the clocks match. Since one counter must be compared to the other counter, one of the counters is going to be used as a reference clock to set the period length. In some examples herein the local clock is used as the reference frame clock. Accordingly, matching rates can involve counting out a preset number of local frame clock cycles (e.g., 4 each frame of 32 samples using a TDM8 bitstream). For example, the network frame clock can be evaluated after 110×32-sample frames (e.g., 110×4=440 counts of the local frame clock). The same can be done for the local clock. If the network and local frame clocks match, in this example there would be exactly 440 counts in both counters, 880 during the next period, etc. However, if the network frame counter has more counts (e.g., it is at 888 counts while the local frame counter is at 880 counts), the network clock is ahead by a factor 888/880=1.009. This would require that the local clock needs to be sped up by the same factor, to match the network clock.

In some examples herein, placing event counters on a frame clock is done by creating an interrupt service routine (ISR) that fires every time a frame is received in the DSP. In some examples a DMA engine will be configured to generate an interrupt. The interrupt service routines (ISRs) will increment the counter every time it fires. Since the network audio serial port and output audio serial port 66 are independent, this normally would require two ISRs, one for each audio serial port. In a DSP, ISRs require a substantial amount of processing, as it takes many DSP core clock cycles to save the processor context, run the ISR function, and restore the context. In order to reduce the DSP core processing involved in processing ISRs, in some examples herein only one ISR is employed.

In some examples, only the ISR associated with the output audio serial port DMA engine 64 is used, while the ISR for the input audio serial port DMA engine 58 is turned off. Output DMA engine 64 can be programmed to kick off the output ISR at the end of reading out the output ping-pong buffer 62, just before the buffer switch. It is known that this event always happens at same time. Thus, the output read pointer position is known a priori, e.g. the same sample buffer position. In an illustrative example, assume that it is position 31; the exact position is not important. The position of the input buffer 60 write pointer is read out to offset calculator 68 during this ISR. The exact write pointer buffer position is not known, as the network clock frame rate may not be the same as the local clock frame rate. However, if the clocks match perfectly, the offset between the input write pointer and output read pointer will be constant, on average. On average because due to interrupt priority and the existence of many other possible interrupts that might fire around the same time, there is some expected read jitter. As a result, there might be some variability in the position of the write pointer. In order to address possible read jitter a moving average filter can be applied on subsequent pointer position to get a stable reading with a stable adjustment to follow. Moving average filters are known in the field. Generally, they take the average over a window of size N samples. As one non-limiting example, say the filter uses four input samples, Sin. That means the average is calculated from samples, Sin(N), Sin(N−1), Sin(N−2) and Sin(N−3) where the sample time is N*ts from to. The average value is then: Sout(N)=(Sin(N−3)+ Sin(N−2)+ Sin(N−1)+ Sin(N))/N. In general the window can be chosen of any length N. In the frequency domain this translates to a low pass filter response. The moving average filter can be elaborated and made better if so desired.

The event counter methodology is accomplished by offset calculator 68. It is initialized at the start of the sample processing. Any offsets in the clock rates are then provided to local clock rate adjuster function 70 that communicates with adjustable clock synthesizer 80 to provide an adjusted local clock rate to DSP 54. As one non-limiting example, if the first read of the write pointer of buffer 60 comes back as position 23, this value is stored in memory. If the pointer position comes back as 24 on average a couple of ISR cycles later, the input buffer write pointer has advanced ahead of the output read pointer by 1 sample. Such a positive difference is used to speed up the local clock to match the two clock rates. Conversely, if the write pointer falls behind, the local clock is slowed down.

Figure 3:
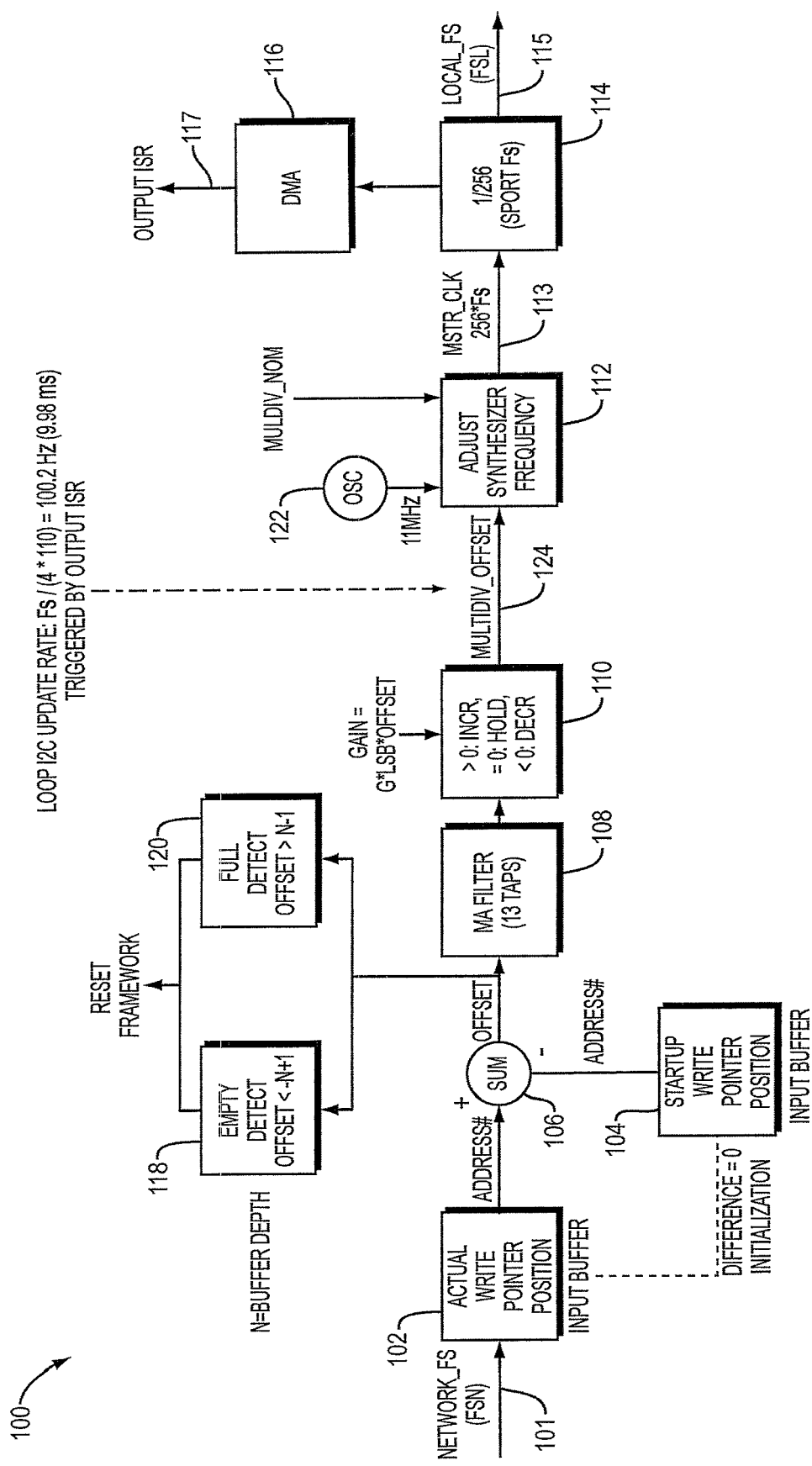
FIG. 3 is a schematic control block diagram of an exemplary clock servo methodology.

FIG. 3 illustrates an exemplary clock servo methodology 100 in a control block diagram form. Events are compared by placing up-counters 102 and 104 on the network frame clock (FSN) 101 and local frame clock (FSL) 115, respectively, and comparing their values using summing function 106. The FSN up counter 102 is counting at the FSN network frame rate. In an example a Cirrus CS2000 PLL (available from Cirrus Logic, Inc., Austin, Tex., USA) is used as the adjustable clock synthesizer 112. The PLL is used in clock synthesizer mode only. The local DSP audio frame rate FSL 115 is derived from the master clock 113 produced by the CS2000 PLL 112 and is divided down by the serial port interface 114 to rate FSL. DMA subsystem 116 is driven by the serial port and triggers the DSP audio framework through interrupt 117 to swap the audio input and output buffers. It also updates the output buffer write pointer 102 position and reads the actual position of the network receive buffer write pointer 102 to calculate the counter position difference reflected by subtraction block 106 captured physically implemented in a software interrupt service routine. Clock adjustments are made through writing the I2C ratio 0 register. The I2C writes cannot be done at the 44.1 kHz frame rate as this would be too fast for the I2C. To determine a reasonable rate, the time to buffer overflow or underflow for a maximum crystal deviation between the network clock and the local clock is considered. A typical maximum crystal deviation is 200 PPM, which can be an assumed deviation for the network frame clock. When the local clock 122 drifts in the opposite direction to −200 PPM, it can be calculated that it will take 78 frames before a buffer overflow occurs. At a nominal 44.1 kHz the time to overflow is approximately 1800 ms. In other words, if the CS2000 registers are updated at an approximate 10 ms interval rate, there are 180 updates to make the proper adjustments to pull the clock back in to synchronization.

A 10 ms update is a very reasonable rate for a single slave I2C bus connection 124. During each 10 ms interval the pointers are read 110 times, which easily provisions for an up to 11 tap position deep moving average filter 108. The bandwidth of such a filter at a sample rate of 10 ms is approximately $0.2*100$ Hz/2=10 Hz. This is more than enough to obtain a stable pointer reading. The exact update rate of the CS2000 is 44.1 kHz/(4 Fs cycles*110 counts)= 100.2 Hz or 9.98 ms. The control loop 100 can be implemented as a state machine. The I2C peripheral and driver can be configured as a master to minimize write overhead for the DSP and wasting core cycles.

The CS2000 12.20 format can be used for the ratio adjustments. Multiple small steps should be made when adjusting the frequency smoothly towards the new target. The smallest adjustment is on the order of 0.93 PPM for 1 least significant bit (LSB) in the ratio. However, when the pointer offset increases the ratio adjustment should be linearly increased by the same factor, so an offset of 2 doubles the LSB adjustment step size, an offset of 3 triples it, and so on. When decreasing the rate, an offset of −2 causes the 2 LSB to be subtracted from the ratio. A gain G should be applied as well to further customize the LSB step size by G*LSB*OFFSET 110.

The reference crystal on the CS2000 is chosen as a non-integer ratio to the nominal target of 44.1 kHz*256=11.2896 MHz. This is needed to avoid the sigma-delta multiplier divider mechanism inside the CS2000 to cause limit cycling between two adjacent quantized frequency steps at an audio rate, with the risk of causing noise floor problems. 11 MHz was chosen for oscillator 122 as a readily available standard value well below the lowest expected recovered bit clock frequency, given that the CS2000 ratio needs to be above 1.

In some examples the calculated offset is also used to assess whether the ring buffers are in an overflow state 120 or underflow state 118. The read and write pointers are initialized in the same starting positions, which can be defined to be the 'middle' of the buffer. An overflow condition occurs if one buffer is a full buffer depth ahead of the other, e.g. when the absolute pointer offset is larger than 31. When that occurs, the system requires a full re-initialization. The servo control loop should prevent the buffers from overflowing or underflowing by steering an offset 106: output towards zero through clock rate adjustments of the local clock 112: output.

System Initialization

When the system is powered up or is reset, the PLL should be configured before the DSP is taken out of reset. This is because the DSP is essentially using the PLL as the framework clock signal. The PLL needs to be configured to its base rate via dedicated I2C bus 2, item 124, and wait for the PLL to provide a PLL_LOCK status. After that, the DSP can be taken out of reset.

Micro Controller Insertion

Figure 4:
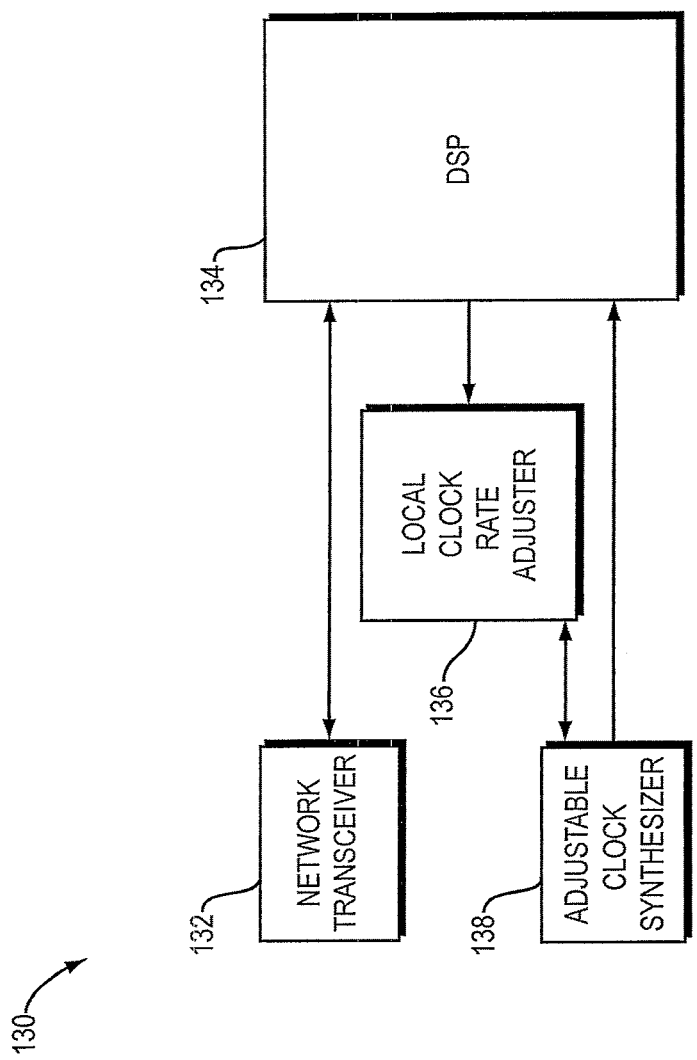
FIG. 4 is a schematic block diagram of an alternative system for synchronizing a local audio processing clock rate of a DSP to an audio clock rate of a network to which the DSP is connected.

In some implementations the control of the PLL to accomplish adjustment of the local clock rate to match the network rate is accomplished as a software method without having to make any hardware modifications. FIG. 4 illustrates system 130 that uses a separate micro-controller to accomplish the local clock rate adjuster 136 (i.e., the clock servo state-machine) that is between DSP 134 and adjustable clock synthesizer 138. Network transceiver 132 is also illustrated. The pre-processed clock ratio is stored in a known memory location inside the DSP. The micro-controller can query this value through the SPI0 bus at a 10 ms interval rate, set by the micro-controller OS timer. The micro-controller is reading this clock ratio and writes it to the adjustable clock synthesizer 138 at the same rate (100 Hz).

The state-machine 136 further monitors the status of transceiver 132, synthesizer 138, and DSP 134 and takes appropriate corrective actions where necessary. For example, when the A2B clock is lost as indicated by A2B_SUSTAIN_MODE_UC the micro-controller 136 will stop updating the PLL until the clock recovers and A2B_SUSTAIN_MODE_UC is de-asserted, indicating clock lock inside the A2B transceiver. It then proceeds to update the clock ratio to synchronize the DSP clock rate to the network rate.

Examples of the systems, methods and apparatuses discussed herein are not limited in application to the details of construction and the arrangement of components set forth in the following description or illustrated in the accompanying drawings. The systems, methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the computer program products, systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Examples of the systems and methods described herein comprise computer components and computer-implemented steps that will be apparent to those skilled in the art. For example, it should be understood by one of skill in the art that the computer-implemented steps may be stored as computer-executable instructions on a computer-readable medium such as, for example, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

Functions, methods, and/or components of the methods and systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), microcontroller(s), and the like, or any combination of these, may be suitable, and may include analog or digital circuit components and/or other components with respect to any particular implementation.

Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Further, functions and components disclosed herein may operate in a time domain, a frequency domain, or a combination of the two, and certain examples include various forms of Fourier or similar analysis, synthesis, and/or transforms to accommodate processing in the various domains.

Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for synchronizing a local audio processing clock rate of a digital signal processor (DSP) to an audio clock rate of a network to which the DSP is connected, comprising:
   an adjustable clock synthesizer that is configured to establish the local audio processing clock rate of the DSP;
   a DSP memory that comprises an input buffer that is configured to store audio frames received over the network and an output buffer that is configured to store audio frames that have been read from the input buffer and processed by the DSP;
   wherein the DSP is configured to generate events that comprise interrupts that are generated when audio data frames are inputted or outputted from the DSP memory; and
   wherein the DSP is further configured to monitor the generated events over time and based on the monitored events cause the adjustable clock synthesizer to adjust the local audio processing clock rate of the DSP to better match the network audio clock rate.

2. The system of claim 1 wherein the local audio processing clock is a frame clock and the audio clock of the network is a frame clock.

3. The system of claim 1 wherein the DSP is configured to monitor generated events by counting the interrupts.

4. The system of claim 1 wherein the input and output buffers are each configured to simultaneously read and write audio data.

5. The system of claim 4 wherein the generated events are based on audio frames read from the output buffer.

6. The system of claim 5 wherein the DSP monitoring of events comprises a comparison of events that are based on audio frames read from the output buffer and a readout of an input buffer write pointer position.

7. The system of claim 6 wherein the DSP is further configured to apply a moving average filter to the readout of the input buffer write pointer position.

8. The system of claim 6 wherein the DSP is configured to cause the adjustable clock synthesizer to adjust the local audio processing clock rate of the DSP based on a difference over time between a read pointer of the output buffer and the input buffer write pointer.

9. The system of claim 8 wherein the DSP causes the adjustable clock synthesizer to slow down the local audio processing clock rate if the input buffer write pointer has receded as compared to the output buffer read pointer.

10. The system of claim 8 wherein the DSP is further configured to assess whether either buffer is in an overflow or underflow condition based on the difference over time between the output buffer read pointer and the input buffer write pointer.

11. The system of claim 10 wherein the buffers each have a depth and wherein an underflow or overflow is based on the difference over time between the output buffer read pointer and the input buffer write pointer being at least equal to the buffer depth.

12. The system of claim 8 wherein the DSP causes the adjustable clock synthesizer to speed up the local audio processing clock rate if the input buffer write pointer has advanced as compared to the output buffer read pointer.

13. A system for synchronizing a local audio processing clock rate of a digital signal processor (DSP) to an audio clock rate of a network to which the DSP is connected, comprising:

an adjustable clock synthesizer that is configured to establish the local audio processing clock rate of the DSP;

wherein the DSP is configured to count cycles of both a local audio processing frame clock of the DSP and an audio frame clock of the network to which the DSP is connected and based on the counted cycles cause the adjustable clock synthesizer to adjust the local audio processing clock rate of the DSP to better match the network audio clock rate;

wherein the DSP is configured to generate an interrupt when audio data frames are inputted or outputted from a first DSP memory; and wherein the DSP is configured to count cycles of both the local audio processing frame clock of the DSP and the audio frame clock of the network to which the DSP is connected based on the generated interrupts and the state of a second DSP memory during each interrupt.

14. The system of claim 13 wherein the DSP is configured to cause the adjustable clock synthesizer to adjust the local audio processing clock rate of the DSP based on a difference between an output read pointer of a DSP output buffer and an input write pointer of a DSP input buffer.

* * * * *